United States Patent
Polackal

(10) Patent No.: US 10,048,916 B1
(45) Date of Patent: Aug. 14, 2018

(54) PORTABLE MEMORY DEVICE MAINTAINING FOLDER NAMES DESIGNATING FINISHING SETTINGS AND WORKFLOWS

(71) Applicant: Xerox Corporation, Norwalk, CT (US)

(72) Inventor: Maju P. Polackal, Kottayam (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/495,055

(22) Filed: Apr. 24, 2017

(51) Int. Cl.
    *G06F 3/12* (2006.01)
    *G06K 15/00* (2006.01)

(52) U.S. Cl.
    CPC .......... *G06F 3/1275* (2013.01); *G06F 3/1205* (2013.01); *G06F 3/127* (2013.01); *G06K 15/403* (2013.01); *G06K 15/4045* (2013.01)

(58) Field of Classification Search
    CPC .............................. G06F 3/1275; G06F 3/1205
    See application file for complete search history.

(56) References Cited

U.S. PATENT DOCUMENTS

| | | | |
|---|---|---|---|
| 6,795,327 B2 * | 9/2004 | Deng | .................... G06F 3/0607 365/230.03 |
| 7,173,722 B1 | 2/2007 | Lapstun et al. | |
| 7,548,938 B2 | 6/2009 | Minami | |
| 8,107,122 B2 | 1/2012 | Riesel et al. | |
| 8,237,966 B2 | 8/2012 | Honda | |
| 2001/0042086 A1 | 11/2001 | Ueda et al. | |
| 2005/0068547 A1 * | 3/2005 | Negishi | ............. H04N 1/00408 358/1.1 |
| 2005/0105135 A1 | 5/2005 | Takahashi | |
| 2008/0007781 A1 | 1/2008 | Oike et al. | |

\* cited by examiner

*Primary Examiner* — Ibrahim Siddo
(74) *Attorney, Agent, or Firm* — Gibb & Riley, LLC

(57) ABSTRACT

Names of finishing-job storage folders stored within a portable electronic memory apparatus are limited to only names of known finishing workflows. Connection of the portable electronic memory apparatus to a printing system is automatically detected, and for each print job, the printing system is automatically instructed to perform a finishing workflow that corresponds to the name of the finishing-job storage folder in which the print job is located. The printing system is required to evaluate whether the printing system can perform the finishing workflow, based on the status of the finishing components. Thus, the printing system is required either to perform the finishing workflow (if the printing system can perform the finishing workflow) or provide a menu on a user interface of the printing system (if the printing system cannot perform the finishing workflow).

20 Claims, 11 Drawing Sheets

212 — YOUR FOLDERS SHOULD HAVE NAMES THAT MATCH THE FINISHING FUNCTIONS. PLEASE USE THE FOLLOWING PREVIOUSLY ESTABLISHED FOLDER NAMES. ALL JOBS YOU PLACE IN EACH FOLDER WILL RECEIVE THE NOTED FINISHING OPERATIONS.

"Insta_Booklet" FOR BOOKLET FINISHING
"Insta_Staple" FOR SINGLE STAPLING IN THE UPPER LEFT CORNER
"Insta_StapleR" FOR SINGLE STAPLING IN THE UPPER RIGHT CORNER
"Insta_Staple2U" FOR 2 STAPLING ALONG THE UPPER SIDE
"Insta_Staple2L" FOR 2 STAPLING ALONG THE LEFT SIDE
"Insta_Staple2R" FOR 2 STAPLING ALONG THE RIGHT SIDE
"Insta_Staple4U" FOR 4 STAPLING ALONG THE UPPER SIDE
"Insta_Staple4L" FOR 4 STAPLING ALONG THE LEFT SIDE
"Insta_Staple4R" FOR 4 STAPLING ALONG THE RIGHT SIDE
"Insta_punch" FOR 2 PUNCHING ALONG THE UPPER SIDE
"Insta_punch2L" FOR 2 PUNCHING ALONG THE LEFT SIDE
"Insta_punch2R" FOR 2 PUNCHING ALONG THE RIGHT SIDE
"Insta_punch4U" FOR 4 PUNCHING ALONG THE UPPER SIDE
"Insta_punch4L" FOR 4 PUNCHING ALONG THE LEFT SIDE
"Insta_punch4R" FOR 4 PUNCHING ALONG THE RIGHT SIDE
"Insta_punch3R" FOR 3 PUNCHING ALONG THE RIGHT SIDE
"Insta_punch3L" FOR 3 PUNCHING ALONG THE LEFT SIDE

PORTABLE MEMORY DEVICE MAINTAINING FOLDER NAMES DESIGNATING FINISHING SETTINGS AND WORKFLOWS

BACKGROUND

Systems and methods herein generally relate to finishing settings and workflows, and more particularly to the use of a portable memory device that maintains folder names that designate different finishing settings and workflows.

Portable memory devices that use industry-standard interfaces (such as universal serial bus (USB) connectors, mini-USB connectors, (SIM) card interfaces) are being produced with ever increasing storage capacity, yet at the same time such devices have seen dramatic price reductions. For example, such devices include, but are not limited to USB sticks, compact flash cards, minicards, smartmedia cards, memory sticks, secure digital cards (SD Cards), etc. In view of these advances, manufacturers of all types of machines, such a printing systems, include interface connections to take advantage of the useful features of such portable memory devices.

Many modern printing devices can print directly from such portable memory devices. In operation, the user connects the portable memory device to a printer, and the printer automatically prints items that are on the portable memory device, without the user performing any action other than connecting the portable memory device (e.g., without the user electing menu options, pushing buttons, etc). However, when finishing options are desired for such printed items, the user needs to manually provide settings to the digital front end (DFE) of the printer to manually program the finishing settings (e.g., for printing a booklet). Similarly, if a user wants to print a job with staple or punch finishing options, the user manually configures the finishing options in the printer's user interface and begins printing.

When this occurs, sometimes the user will struggle to find the correct options in the printer's user interface, especially if the user is not familiar with the user interface settings. For example, if the loaded paper orientation is different, the user may need to change the option that matches the orientation, or change the paper orientation. Similarly if the device is configured with accounting settings and finishing options that are pre-configured, the user may need to re-configure the finisher options every time the user includes different finishing options; and, if the user does not have proper access, they may need to wait for an administrator to re-configure the finishing option.

SUMMARY

Various methods herein automatically detect connection of a universal input/output connector (e.g., universal serial bus (USB) connection) of a portable electronic memory apparatus to a corresponding connector of an external computerized device, using a finishing workflow control program stored in electronic memory media of the portable electronic memory apparatus. When creating or adding new folders, such methods limit the external computerized device from naming finishing-job storage folders stored within the electronic memory media to names other than names of known finishing workflows, using the finishing workflow control program. For example, the names of finishing workflows can include different names for different booklet finishing workflows, different names for different staple finishing workflows, different names for different punching finishing workflows, different names for different folding finishing workflows, different names for different cutting finishing workflows, different names for different laminating finishing workflows, etc. Further, methods herein automatically (using the finishing workflow control program) require the external computerized device to store print jobs by having finishing instructions only within the finishing-job storage folders.

Similarly, methods herein automatically detect the connection of the universal input/output connector to a corresponding connector of a printing system having finishing components, using the finishing workflow control program. For each print job, these methods automatically (using the finishing workflow control program) instruct the printing system to perform a finishing workflow that corresponds to the name of the finishing-job storage folder in which the print job is located. The workflow control program includes finishing settings for the known finishing workflows corresponding to the finishing-job storage folders, and supplies such finishing settings to the printing system. In view of this, these methods automatically require input of the finishing settings when adding a finishing-job storage folder to the electronic memory media.

Methods herein also automatically (using the finishing workflow control program) require the printing system to evaluate whether the printing system can perform the finishing workflow based on the status of the finishing components. Thus, such methods herein automatically (using the finishing workflow control program) require the printing system to either perform the finishing workflow, if the printing system can perform the finishing workflow; or provide a menu on a user interface of the printing system, if the printing system cannot perform the finishing workflow. Selection of the menu on the user interface of the printing system causes the printing system to avoid some of, or all of, the finishing workflow.

Presented in apparatus form, an exemplary portable electronic memory apparatus herein includes (among other components) a universal input/output connector (e.g., USB connection), electronic memory media electrically connected to the universal input/output connector, a finishing workflow control program stored in the electronic memory media, etc. The finishing workflow control program detects connection of the universal input/output connector to an external computerized device.

The finishing workflow control program limits the external computerized device from naming finishing-job storage folders stored within the electronic memory media to names other than names of known finishing workflows. The finishing workflow control program also requires the external computerized device to store print jobs having finishing instructions only within the finishing-job storage folders.

Similarly, the finishing workflow control program detects the connection of the universal input/output connector to a printing system having finishing components. For each of the print jobs that have finishing instructions, the finishing workflow control program instructs the printing system to perform a finishing workflow that corresponds to the name of a finishing-job storage folder in which the print job is located. Thus, the workflow control program includes finishing settings for the known finishing workflows corresponding to the finishing-job storage folders, and supplies such finishing settings to the printing system. In view of this, the workflow control program requires input of the finishing settings when adding a finishing-job storage folder to the electronic memory media.

The finishing workflow control program requires the printing system to evaluate whether the printing system can perform the finishing workflow based on the status of the finishing components. The finishing workflow control program requires the printing system to either perform the finishing workflow, if the printing system can perform the finishing workflow; or provide a menu on a user interface of the printing system, if the printing system cannot perform the finishing workflow. Selection of the menu on the user interface of the printing system causes the printing system to avoid some of, or all of, the finishing workflow.

Printing system embodiments herein include, among other components, a processor. Electrically connected to the processor are components, such as a universal input/output connector (e.g., USB connection), a user interface, a printing engine, finishing components, etc. The processor detects connection of a portable electronic memory apparatus to the universal input/output connector. The processor searches the portable electronic memory apparatus for print jobs having finishing instructions. If the processor detects print jobs having finishing instructions that are not within finishing-job storage folders (having names only of known finishing workflows) the processor causes the user interface to display: a message to include the print jobs having finishing instructions only within the finishing-job storage folders having names only of known finishing workflows; and an option to store the print jobs having finishing instructions within finishing-job storage folders having names only of known finishing workflows.

For each of the print jobs that have finishing instructions, the processor instructs the finishing components to perform a finishing workflow that corresponds to the name of the finishing-job storage folder in which the print job is located. The portable electronic memory apparatus includes finishing settings for the known finishing workflows corresponding to the finishing-job storage folders; and supplies the finishing settings to the printing system. Thus, the processor requires input of finishing settings when adding a finishing-job storage folder to the portable electronic memory apparatus.

The processor also evaluates whether the finishing workflow can be performed based on the status of the finishing components. Thus, the processor requires either: the finishing components to perform the finishing workflow, if the printing system can perform the finishing workflow; or the user interface to provide a menu, if the finishing components cannot perform the finishing workflow. Selection of the menu on the user interface causes the finishing components to avoid some of, or all of, the finishing workflow.

These and other features are described in, or are apparent from, the following detailed description.

BRIEF DESCRIPTION OF THE DRAWINGS

Various exemplary systems and methods are described in detail below, with reference to the attached drawing figures, in which:

FIGS. 4-5 are schematic diagrams illustrating menus provided herein;

DETAILED DESCRIPTION

Figure 1:
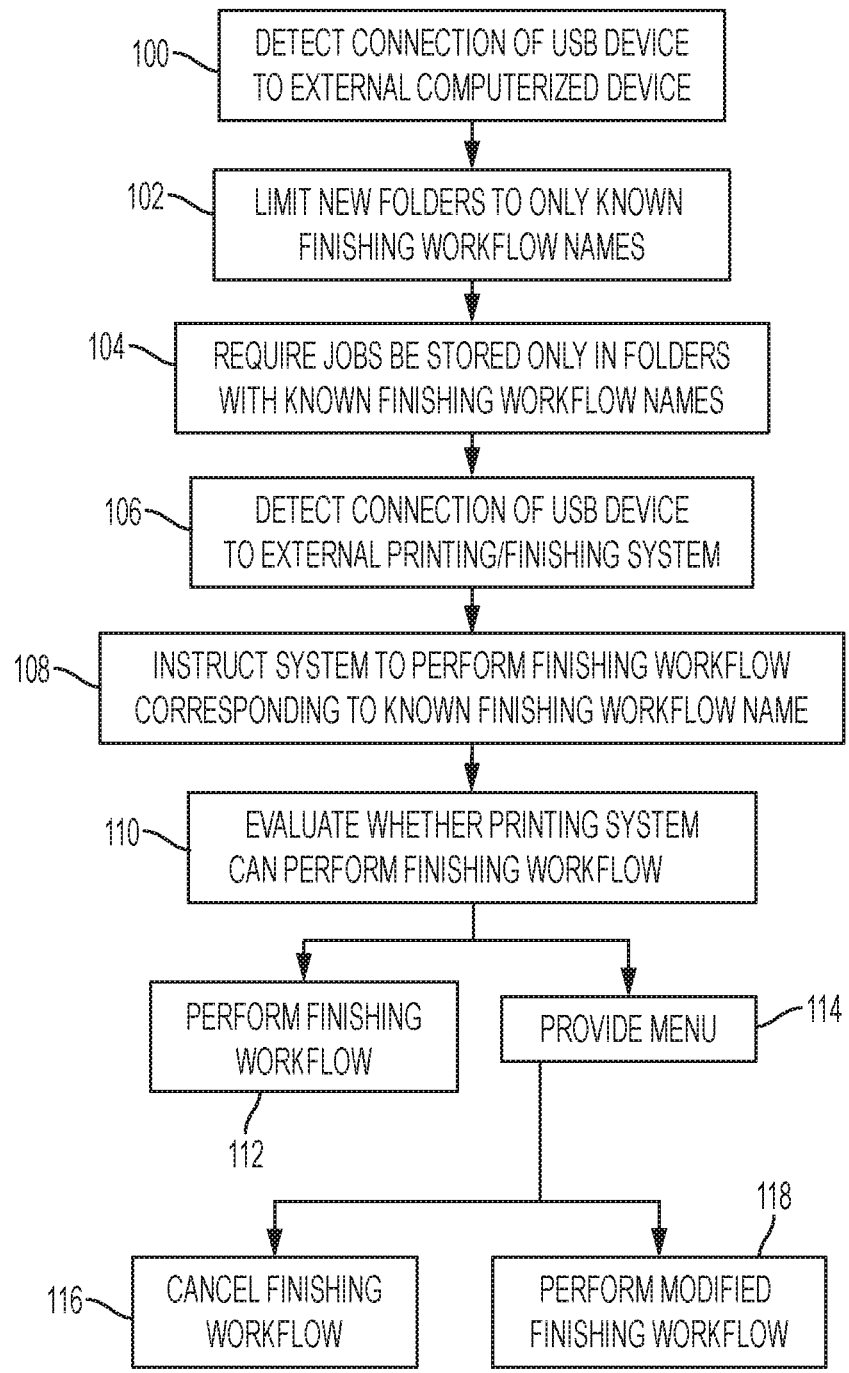
FIG. 1 is a flow diagram of various methods herein.

As mentioned above, when selecting finishing options for printed items, the user is usually required to manually provide settings to the digital front end to program the finishing settings. In view of this, the systems and methods herein utilize the names of the folders on the portable memory device to automatically provide finishing settings, thereby avoiding having the user manually program the finishing settings.

For example, for booklet printing from a USB device, systems and devices herein allow the user to create a folder in the USB device named "Insta_Booklet" where, for example, "I" and "B" may only be allowed as capital letters. The user copies all documents that the user wants to print with the booklet finishing option into the Insta_Booklet folder. Once the USB device is plugged into the printing and finishing system, the printing and finishing system will automatically calculate the cover pages and inner pages and print the outputs (without any user action, other than the user connecting the USB device to the printer).

In another example, for staple printing from the USB device, systems and devices herein allow the user to create a different folder in the USB device named "Insta_Staple" where, for example, "I" and "S" may only be allowed as capital letters. The user copies all documents that the user wants to print with the staple finishing option into the Insta_Staple folder. Once the USB device is plugged into the printing and finishing system, the printing and finishing system will automatically perform staple finishing (without any user action, other than the user connecting the USB device to the printer). In this example, 2 staple finishing may be the default staple option. If the user needs single staple finishing, or 4 staple finishing, the folder can be named "Insta_Staple1" for single staple finishing, or "Insta_staple4" for 4 staple finishing. Therefore, the different folder names may not just distinguish the type of finishing activity that is performed, but the different folder names can also indicate various finishing options within the same type of finishing function.

With a different example, which can be for punch printing from the USB device, with systems and devices herein the user can create a different folder in the USB device named "Insta_Punch" where, for example, "I" and "P" may only be allowed as capital letters. The user copies all documents that the user wants to print with the punch finishing option into the Insta_Punch folder. Once the USB device is plugged into the printing and finishing system, the printing and finishing system will automatically perform punch finishing. In this example, 2 punch finishing may be the default punch option. If the user needs 3 punch finishing or 4 punch finishing, the folder can be named "Insta_Punch3" for 3 punch finishing, or "Insta_punch4" for 4 punch finishing. Again, the different folder names can indicate various finishing options within the same type of finishing function.

FIG. 1 is flowchart illustrating exemplary methods herein. In item 100, these methods automatically detect connection of a universal input/output connector (e.g., universal serial bus (USB) connection) of a portable electronic memory apparatus to a corresponding connector of an external computerized device, using a finishing workflow control program stored in a computerized device, printing device, or in electronic memory media of the portable electronic memory apparatus.

In item 102, when creating or adding new folders, such methods limit the external computerized device from naming finishing-job storage folders stored within the electronic memory media to only names of known finishing workflows (or such folder naming can simply be a recommendation, instead of a requirement) using the finishing workflow control program.

For example, as shown in the menu on the user interface 212 in FIG. 4, the names of finishing workflows can include different names for different booklet finishing workflows, different names for different staple finishing workflows, different names for different punching finishing workflows, different names for different folding finishing workflows, different names for different cutting finishing workflows, different names for different laminating finishing workflows, etc. More specifically, FIG. 4 shows that the menu 250 produced in item 102 can notify the user that the folders should have names that match the finishing functions, can ask the user to use previously established folder names, and inform the user that all jobs placed in each folder on the portable memory device will receive the noted finishing operations automatically, all without any user input.

In the example shown in FIG. 4, the folder name "Insta_Booklet" is used for the known finishing workflow of booklet finishing; the folder name "Insta_Staple" is the default stapling workflow folder and is used for the known finishing workflow of single stapling in the upper left corner; the folder name "Insta_StapleR" is used for single stapling in the upper right corner; the folder name "Insta_Staple2U" is used for the known finishing workflow of 2 stapling along the upper side; the folder name "Insta_Staple2L" is used for the known finishing workflow of 2 stapling along the left side; the folder name "Insta_Staple2R" is used for the known finishing workflow of 2 stapling along the right side; the folder name "Insta_Staple4U" is used for the known finishing workflow of 4 stapling along the upper side; the folder name "Insta_Staple4L" is used for the known finishing workflow of 4 stapling along the left side; the folder name "Insta_Staple4R" is used for the known finishing workflow of 4 stapling along the right side; the folder name "Insta_punch" is the default punch workflow folder used for the known finishing workflow of 2 punching along the upper side; the folder name "Insta_punch2L" is used for the known finishing workflow of 2 punching along the left side; the folder name "Insta_punch2R" is used for the known finishing workflow of 2 punching along the right side; the folder name "Insta_punch4U" is used for the known finishing workflow of 4 punching along the upper side; the folder name "Insta_punch4L" is used for the known finishing workflow of 4 punching along the left side; the folder name "Insta_punch4R" is used for the known finishing workflow of 4 punching along the right side, etc. While some exemplary known workflows and representative folder names are discussed herein, those ordinarily skilled in the art would understand that any appropriate folder names could be utilized for any finishing workflows, whether currently known or developed in the future.

Further, in item 104, methods herein automatically (using the finishing workflow control program) require, or recommend that, the external computerized device store print jobs having finishing instructions only within the finishing-job storage folders. Similarly, in item 106, methods herein automatically detect connection of the universal input/output connector to a corresponding connector of a printing system having finishing components, using the finishing workflow control program.

For each print job, as shown in item 108, these methods automatically (using the finishing workflow control program) instruct the printing system to perform a finishing workflow based solely (only) on the name of the finishing-job storage folder in which the print job is located. Thus, the workflow control program includes finishing settings (e.g., such as those shown in FIG. 4) for the known finishing workflows corresponding to the finishing-job storage folders (in for example a look-up table, database, etc., maintained in the portable memory media) and supplies such finishing settings to the printing system in item 108. In view of this, these methods automatically require input of the finishing settings, when adding a finishing-job storage folder to the electronic memory media in item 102.

As shown in item 110, methods herein also automatically (using the finishing workflow control program) require the printing system to evaluate whether the printing system can perform the finishing workflow based on the status of the finishing components. Thus, such methods herein automatically (using the finishing workflow control program) require the printing system to either perform the finishing workflow in item 112, if the printing system can perform the finishing workflow; or provide a menu of other alternatives on a user interface of the printing system in item 114, if the printing system cannot perform the finishing workflow.

Figure 5:
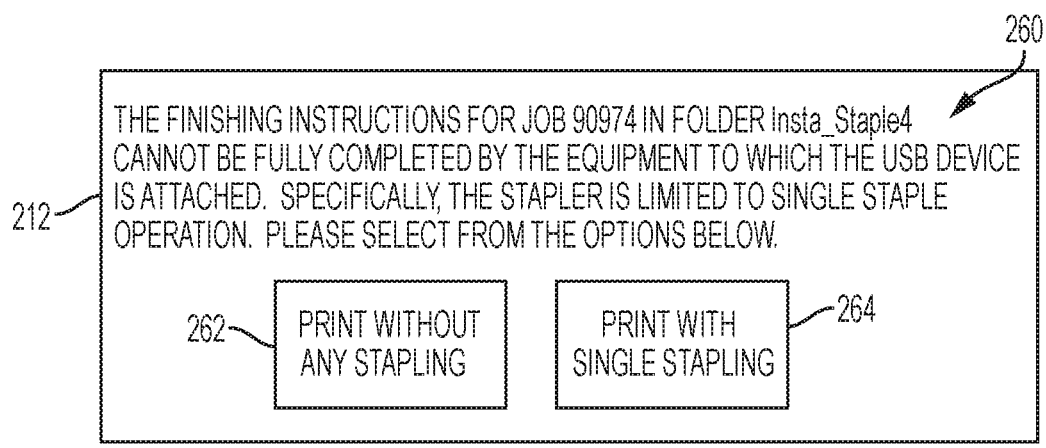

FIG. 5 shows an exemplary menu 260 that could be provided in item 114. This menu 206 explains that the finishing instructions for a certain job (e.g., job 90974) in a certain folder (e.g. folder Insta_Staple2U that requires, for example, 2 staples along the upper side of the sheets) cannot be fully completed by the equipment to which the USB device is attached. Specifically, the message on the user interface 212 can inform the user that the stapler is limited to single staple operation. Further, the menu 260 can ask the user to select from options such as to print without any stapling 262, or to print with the single stapling 264 of which the finisher is capable.

Selection of the menu on the user interface of the printing system causes the printing system to avoid some of, or all of, the finishing workflow. Therefore, the user is provided the menu option (in item 114) to cancel the finishing workflow entirely in item 116, or to perform as much of the finishing workflow as the printing system is capable of in item 118.

As shown, the methods herein solve technological problems by dramatically simplifying finishing options through the utilization of folder names on a portable memory device. Therefore, with the methods and systems herein, the user does not need to interact with the user interface of the printing in finishing systems because the folder name on the portable memory device gives the printing and finishing system all the information needed to perform all the printing and finishing operations.

Figure 2:
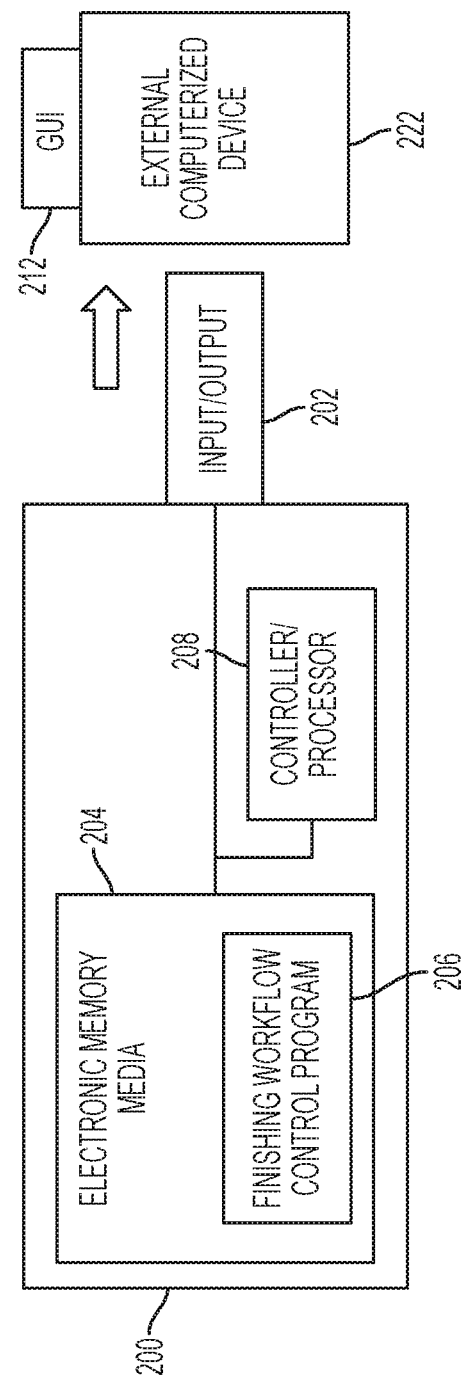
FIG. 2 is a schematic diagram illustrating portable memory devices herein.

As shown in FIG. 2, an exemplary portable electronic memory apparatus 200 (e.g., USB stick) herein includes (among other components) a universal input/output connector 202 (e.g., USB connection), electronic memory media 204 electrically connected to the universal input/output connector 202, a finishing workflow control program 206 stored in the electronic memory media 204, an optional embedded processor 208, etc. The electronic memory media 204 can be a non-transitory, tangible, computer storage medium device (which can be optical, magnetic, capacitor based, etc., and is different from a transitory signal) that is readable by other electronic and computerized devices 222. Generally, such memory devices 200 are not powered and do not contain processing functionality; but, instead such devices 200 are usually only used as small, easily transported computer data and computer program storage devices.

Figure 3:
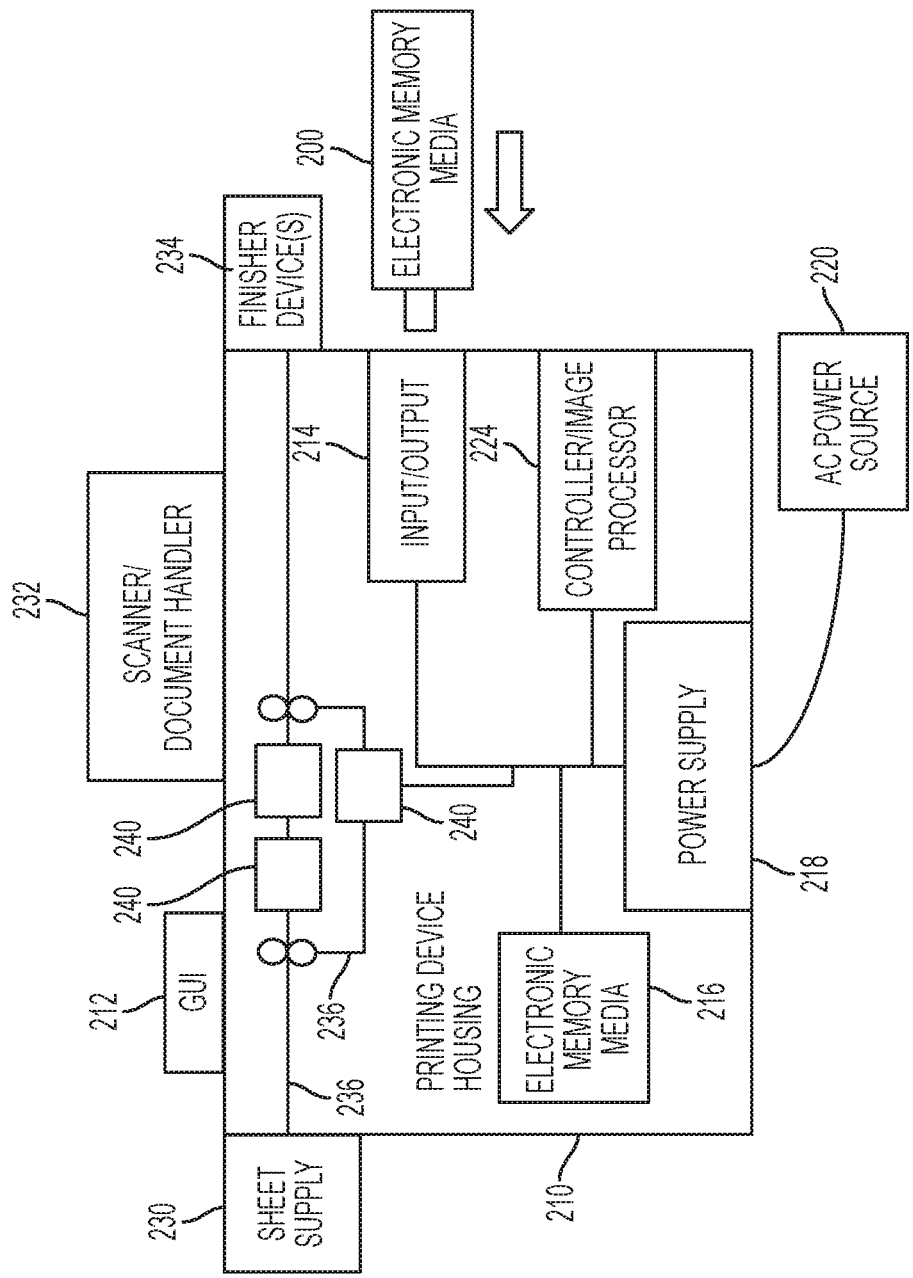
FIG. 3 is a schematic diagram illustrating printing and finishing systems herein.

FIG. 3 illustrates many components of printer structures 210 herein that can comprise, for example, a printer, copier, multi-function machine, multi-function device (MFD), etc. The printing device 210 includes a controller/tangible processor 224 and a communications port (input/output) 214 operatively connected to the tangible processor 224 and to a computerized network external to the printing device 210. Also, the printing device 210 can include at least one accessory functional component, such as a graphical user interface (GUI) assembly 212. The user may receive messages, instructions, and menu options from, and enter instructions through, the graphical user interfaces or control panels mentioned herein 212.

The input/output device 214 is used for communications to and from the printing device 210 and comprises a wired device or wireless device (of any form, whether currently known or developed in the future). The tangible processor 224 controls the various actions of the printing device 210. A non-transitory, tangible, computer storage medium device 216 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 3, a body housing has one or more functional components that operate on power supplied from an alternating current (AC) source 220 by the power supply 218. The power supply 218 can comprise a common power conversion unit, power storage element (e.g., a battery, etc), etc.

The printing device 210 includes at least one marking device (printing engine(s)) 240 that use marking material, and are operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 210 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, etc. The one or more printing engines 240 can include, for example, devices that use a photoreceptor belt or an intermediate transfer belt or devices that print directly to print media (e.g., inkjet printers, ribbon-based contact printers, etc.).

The finishing workflow control program 206 detects connection of the universal input/output connector 202 to an external computerized device 222, such as a general purpose computer that is powered and has its own processor, user interface (e.g., graphic user interface (GUI) 212), etc.

When the connected external computerized device 222 attempts to store a print job having finishing instructions, the finishing workflow control program 206 limits (prevents or recommends that) the connected external computerized device 222 from naming finishing-job storage folders stored within the electronic memory media 204 to names other than names of known finishing workflows (e.g., by providing messages on the user interface 212 as to how the folders should be named). The finishing workflow control program 206 also recommends/requires the external computerized device 222 to store print jobs having finishing instructions only within the properly named finishing-job storage folders (e.g., by providing messages on the user interface 212, etc.).

Similarly, the finishing workflow control program 206 detects connection of the universal input/output connector 202 to a corresponding connector 214 of a printing system 210 (that has finishing components 234). For each of the previously mentioned print jobs that have finishing instructions, the finishing workflow control program 206 instructs the printing system 210 to perform a finishing workflow that corresponds to the name of the finishing-job storage folder in which the print job is located. Thus, the workflow control program 206 includes finishing settings for the known finishing workflows corresponding to the finishing-job storage folders, and supplies such finishing settings to the printing system 210. In view of this, the workflow control program 206 requires input of the finishing settings when adding a finishing-job storage folder to the electronic memory media 204.

The finishing workflow control program 206 requires the printing system 210 to evaluate whether the printing system 210 can perform the finishing workflow based on the status of the finishing components 234. The finishing workflow control program 206 also requires the printing system 210 to either perform the finishing workflow, if the printing system 210 can perform the finishing workflow; or provide a menu on a user interface 212 of the printing system 210, if the printing system 210 cannot perform the finishing workflow. Selection of the menu on the user interface 212 of the printing system 210 causes the printing system 210 to avoid some of, or all of, the finishing workflow.

Therefore, as shown above, printing system 210 embodiments herein include, among other components, a processor 224. Electrically connected to the processor 224 are components such as, a universal input/output connector 214 (e.g., USB connection), a user interface 212, a printing engine 240, finishing components 234, etc. The processor 224 detects connection of a portable electronic memory apparatus to the universal input/output connector 214. The processor 224 searches the portable electronic memory apparatus for print jobs having finishing instructions. If the processor 224 detects print jobs having finishing instructions that are not within finishing-job storage folders (having names only of known finishing workflows) the processor 224 causes the user interface 212 to display: a message to include the print jobs having finishing instructions only within the finishing-job storage folders having names only of known finishing workflows; and an option to store the print jobs having finishing instructions within finishing-job storage folders having names only of known finishing workflows.

For each of the print jobs that have finishing instructions, the processor 224 instructs the finishing components 234 to perform a finishing workflow that corresponds to the name of the finishing-job storage folder in which the print job is located. The portable electronic memory apparatus includes finishing settings for the known finishing workflows corresponding to the finishing-job storage folders; and supplies the finishing settings to the printing system 210. Thus, the processor 224 requires input of finishing settings when adding a finishing-job storage folder to the portable electronic memory apparatus.

The processor 224 also evaluates whether the finishing workflow can be performed based on the status of the finishing components 234. Thus, the processor 224 requires either: the finishing components 234 to perform the finishing workflow, if the printing system 210 can perform the finishing workflow; or the user interface 212 to provide a menu, if the finishing components 234 cannot perform the finishing workflow. Selection of the menu on the user interface 212 causes the finishing components 234 to avoid some of, or all of, the finishing workflow.

The hardware described herein plays a significant part in permitting the foregoing method to be performed, rather than function solely as a mechanism for permitting a solution to be achieved more quickly, (i.e., through the utilization of a computer for performing calculations), because methods herein cannot be performed without the equipment described. For example, methods herein require that specifically named folders be included within certain portable memory devices, and such methods require that finishing machines respond in different ways depending upon the names of the various folders that are included within the portable memory devices. Therefore, the methods described herein become irrational or non-functional without the machines that they function with, mandating that such methods cannot be performed without such machines and that such hardware therefore plays a significant part in permitting the methods to be performed.

As would be understood by one ordinarily skilled in the art, the processes described herein cannot be performed by a human alone (or one operating with a pen and a pad of paper) and instead such processes can only be performed by a machine. For example, if one were to manually attempt to alter the portable memory devices and/or perform the finishing operations that are performed by the methods and devices discussed herein, the manual process would be impossible because humans are not capable of electronically altering or reading from portable memory devices without using some form of machine, and similarly humans are incapable of stapling, hole punching, creating booklets, without some type of mechanical device. Processes such as altering electronic charges within memory structures of portable memory devices, electronically storing data, etc., requires the utilization of different specialized machines, and humans performing such processing would not produce useful results. Specifically, processes such as creating folders within electronic storage devices requires changing the charge of microscopic physical features to electronically store 1's and 0's, etc., which instead requires the utilization of different specialized machines, and humans performing such processing would not produce useful results.

Further, such machine-only processes are not mere "post-solution activity" because the methods utilize machines at each step, and cannot be performed without machines. Specifically, the methods herein require the user to provide proper names of electronic folders within the portable electronic devices, require the user to physically connect portable electronic devices to computerized devices and to fronting and finishing systems, etc. In other words, these various machines are integral with the methods herein because the methods cannot be performed without the machines (and cannot be performed by humans alone).

Additionally, the methods herein solve many highly complex technological problems. For example, as mentioned above, users suffer from the technological problem of selecting finishing options for such printed items, where the user needs to manually provide settings to the digital front end (DFE) of printing in finishing systems to program the finishing settings (e.g., for printing a booklet); where sometimes the user will struggle to find the correct options in the user interface, especially if the user is not familiar with the user interface settings. Also, the user may need to re-configure the finisher options every time the user uses different finishing options; and, if the user does not have proper access, they may need to wait for an administrator to re-configure the finishing option. Methods herein solve these technological problems by dramatically simplifying finishing options through the utilization of folder names on the portable memory device. Therefore, with the methods and systems herein, the user does not need to interact with the user interface of the printing in finishing systems because the folder name on the portable memory device gives the printing in finishing system all the information needed to perform all the printing and finishing operations. This reduces the amount of electronic storage and processing capacity that a user must maintain, and also reduces the technological updates that a provider is required to satisfy.

For example, as mentioned above, the methods and devices herein greatly simplify the operation from the user's viewpoint by reducing the number of interactions with the user interface, which decreases the amount of time needed to perform the operations described herein, etc. This, in turn, reduces the amount of time that the user interface is on (thereby saving power) and also reduces the load on all processing components (e.g., reduces load on the processor, by avoiding directions to provide menus and receive input to such menus, and process such input; etc.). Thus, the methods herein reduce the amount and complexity of hardware and software needed to be purchased, installed, and maintained, thereby solving a substantial technological problem that providers experience today.

Figure 6A:
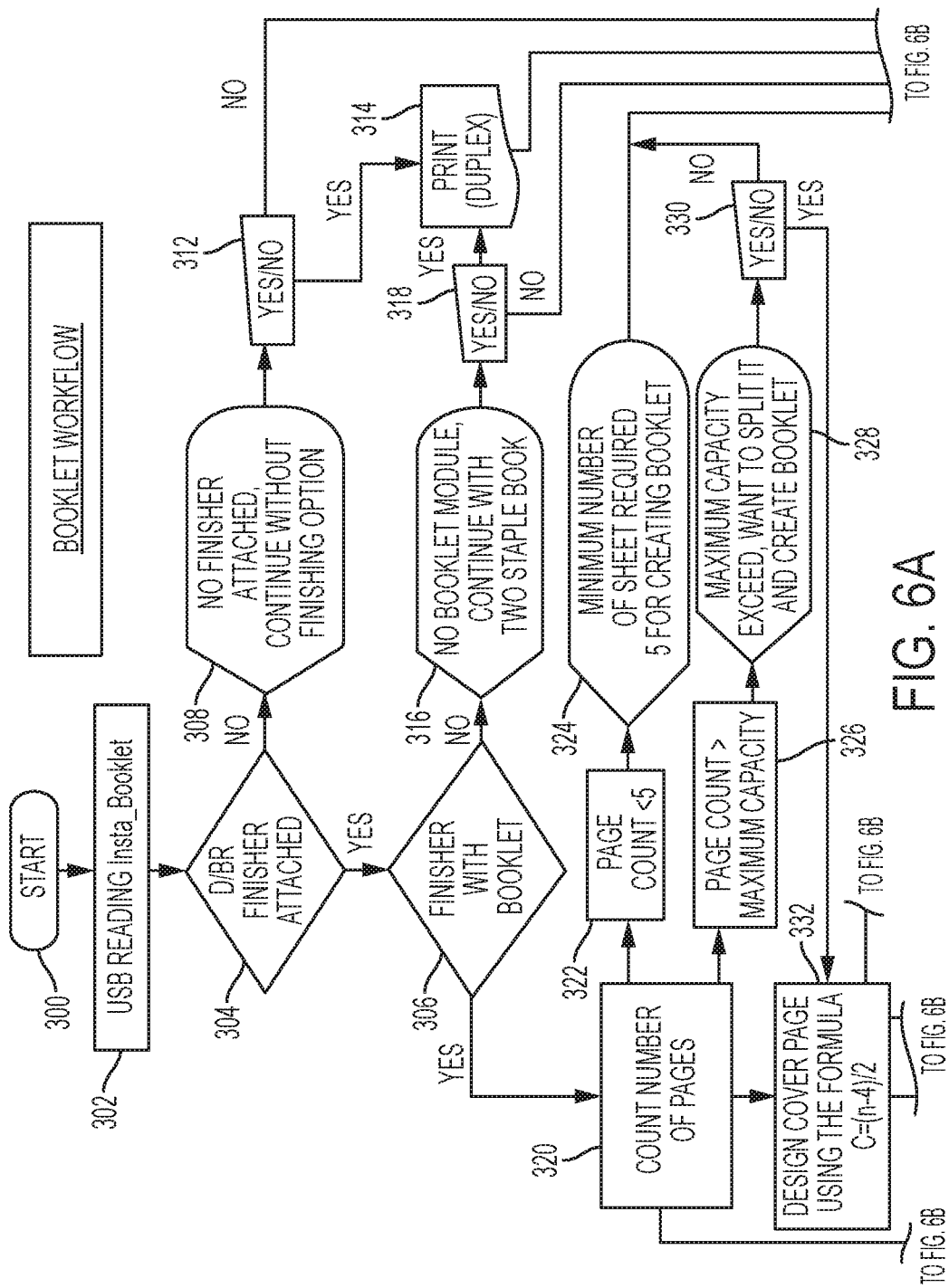
FIGS. 6A-B, are flow diagrams of various methods herein.
Figure 6B:
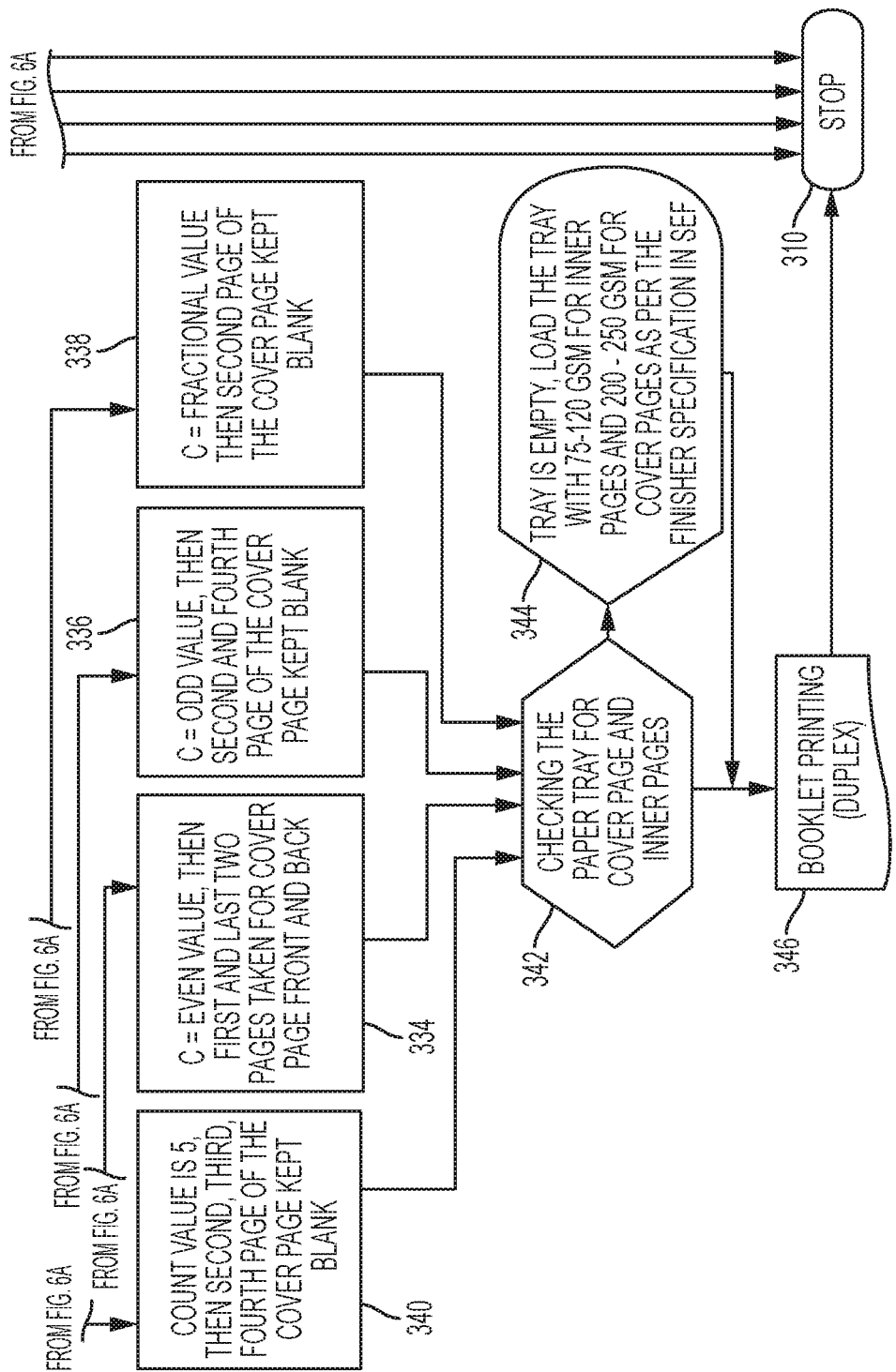

FIGS. 6A-B is a flowchart that shows an exemplary booklet process. While one process is shown to illustrate some of the features of the embodiments herein, other processes could be used, and FIGS. 6A-B is merely a non-limiting example.

In this booklet example, the user creates a folder named with a proper booklet finishing workflow, and copies the document in to the folder. Once the finishing workflow control program detects the folder name, the finishing workflow control program will check the finisher configuration and calculate the cover pages for booklet job using, for example, the formula $C=(n-4)/2$ where "n" is number of page count and such is assigned to "C". If the value of the "C" is an even number, then the first and last two pages of the documents are used as front and back side of the cover page. If the value of the "C" is an odd number, then the second and fourth pages of the cover page are kept blank. If the value of the "C" is fractional number, then the second pages of the cover page are kept blank. If the "n" value is 5 then, the second, third, and fourth pages of the cover page are kept blank. If the device is connected with Trimmer Blade Module (TBM) and Square Fold Trimmer (SFT), then the minimum trim option will be adjusted, based on the paper used. For example, the cover page device can be adjusted for 200 gsm to 250 gsm, and for inner pages 75 gsm to 105 gsm. If the printing device is connected to a Light Production/Business Ready (D/BR) finisher, and a booklet module is not installed, the finishing workflow control program will provide a menu display on the user interface to ask the user for the confirmation of 2 staple output, and if the printing device is not connected to any finisher, then the finishing workflow control program will ask the user for normal print confirmation, otherwise the printing device will stop the process.

As shown, in item 300, the booklet processing starts. In item 302, USB reading of the Insta_Booklet folder is performed. Item 304 shows that this processing determines whether a D/BR finisher is attached; and, if it is, processing flows to item 306; and otherwise processing flows to item 308. More specifically, in item 308, a message is provided on the user interface that there is no finisher attached, and the user is provided a menu that gives the user the option to continue or not. As shown in item 312, if they do not want to continue, processing flows to item 310 where the processing stops; however, if they want to continue, processing flows to item 314, where duplex printing is performed, after which processing flows to item 310, where the processing stops.

If item 304 determines that the finisher is attached, processing flows to item 306, where the processing determines whether the finisher has a booklet module. If not, the processing flows to item 316, where the processing displays a message to the user that there is no booklet module.

However, rather than just stopping at a message indicating that the device is incapable of performing a requested finishing operation (316), the systems and methods herein go further and determine what similar finishing functions can be performed. For example, a stapler may be available and connected, even though a booklet module may not be. Because stapled sheets and booklets are sometimes acceptable substitutes for some users, the systems and methods herein present a menu option that asks the user whether processing can continue with a double stapled book layout, instead of the unavailable booklet maker. While stapling and booklet making are used in this example as substitutes that are automatically suggested, the systems and methods herein search for all substitutes such as different stapling operations if the requested one is not available, different punch operations if the requested one is not available, booklet making in place of stapling if stapling is not available, etc.

As shown in item 318, if the user does not want to continue with the two staple layout, the processing moves to item 310 where the processing stops. Alternatively if the user wants to continue from item 318, processing flows to item 314, where duplex printing (or possibly stapling) is performed, after which processing flows to item 310, where the processing stops.

If a finisher with a booklet module is found as being attached, and operational in item 306, the processing flows to item 320, where the process counts the number of pages in the document. If the processing determines that the number of pages is less than some predetermined minimum (e.g., 5 pages) for making a booklet in item 322, then processing moves to item 324 where the user is alerted with a display message that the minimum number of sheets required for creating a booklet must be greater than some number (e.g. 5) after which processing flows to item 310, where the processing stops.

However, if the processing process in item 326 determines that the page count of the document is greater than the maximum capacity for making a booklet, the process flows to item 328 where the user is notified on the user interface that the maximum page capacity has been exceeded, and the user is provided a menu option regarding whether the user wants to split the page count and create multiple booklets.

As shown in item 330, if the user does not want to continue, processing flows to item 310 where the processing stops; however, if they want to continue, processing flows to item 332, where the systems and methods herein automatically design a cover page (e.g., using the formula $C=(n-4)/2$, as discussed above).

Continuing with the previous example, the processing process performs a series of calculations regarding the counted number of pages in the document, which can result in different outcomes. When the processing process at item 320 counts the number pages to a specified count value (e.g. 5), then the process flows to item 340, where then the second, third, fourth pages of the cover page are kept blank. Alternatively, in item 332, the formula $C=(n-4)/2$ is used. If C equals an even value number, then first and last two pages are taken for the cover page front and back, as shown in item 334. If, in item 332, C equals an odd value, then the second and fourth page of the document of the cover page are kept blank, as shown in item 336. If, in item 332, C equals a fractional value, then the second page of the cover page is kept blank, as shown in item 338.

After determining the correct cover page layout as shown in items 340, 334, 336, and 338, the process flows to item 342, where the paper tray of the printing device is checked for the cover page and inner pages. If the tray is empty, the processing moves to item 344, where the user is prompted to load the paper tray of the printing device with paper (e.g., 75-120 GSM for the inner pages and 200-250 GSM for the cover pages). Once the paper tray of the printing device is loaded with printing material, the processing process commences with the duplex booklet printing, as shown in item 346.

Figure 7A:
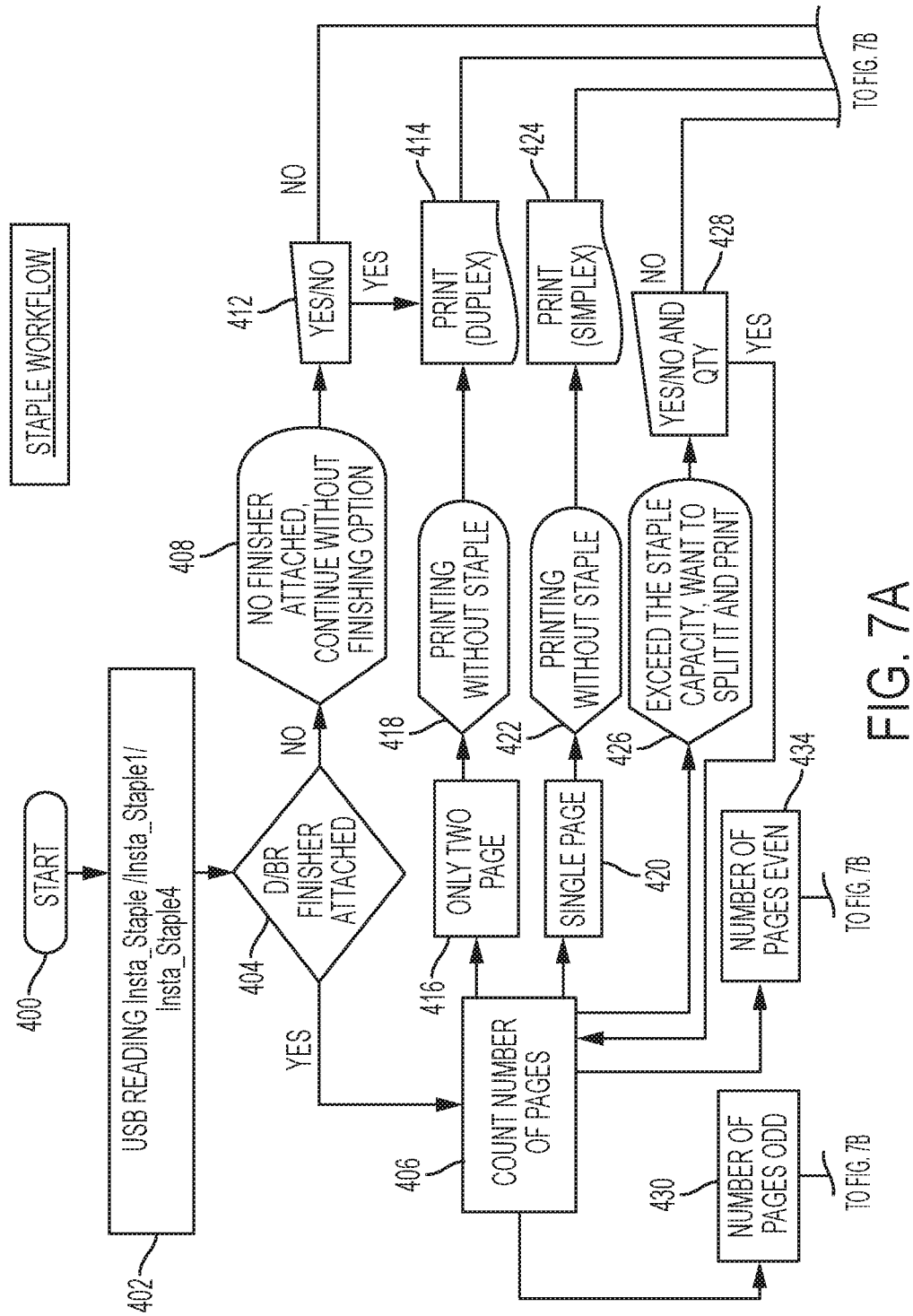
FIGS. 7A-B, are flow diagrams of various methods herein.
Figure 7B:
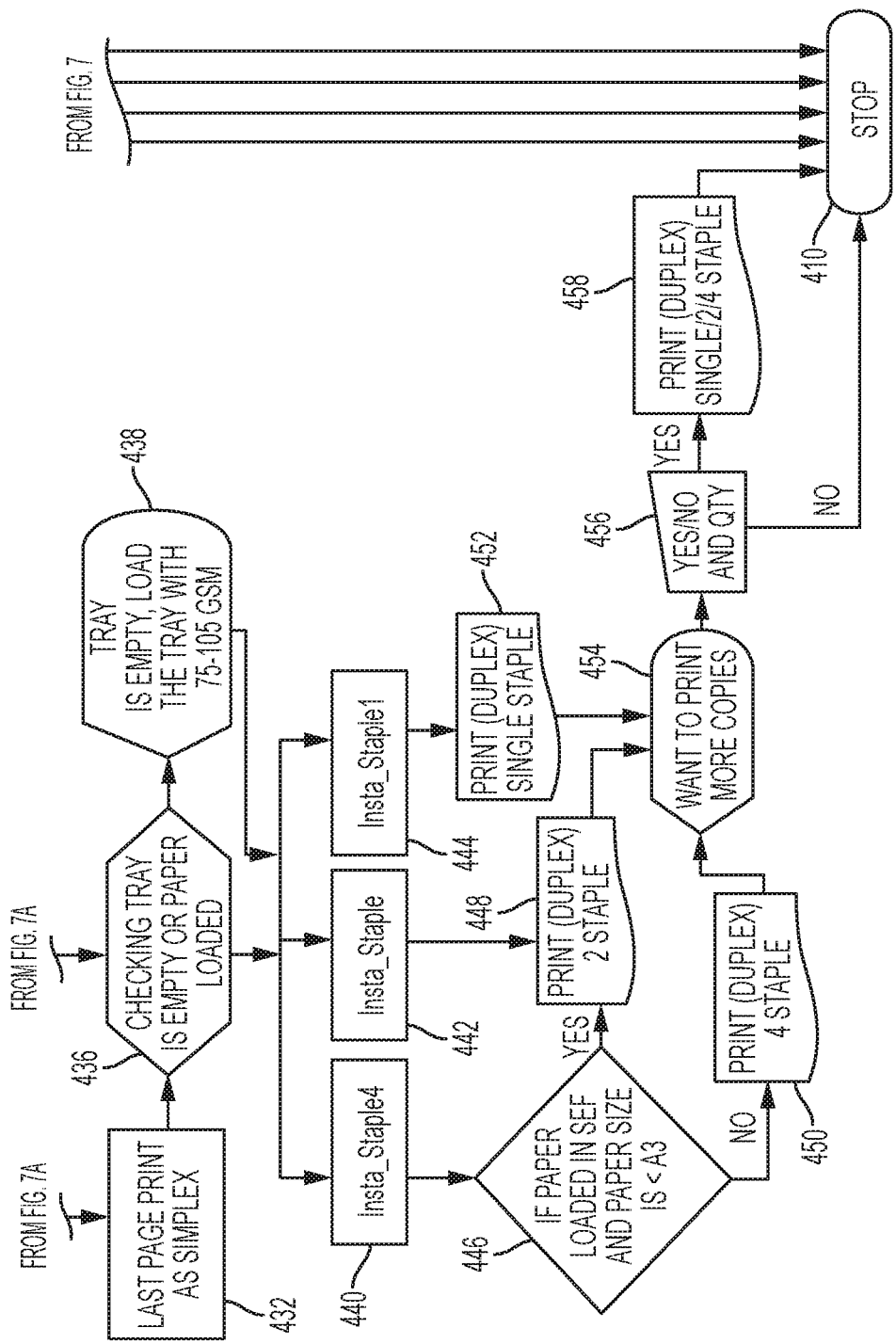

FIGS. 7A-B is a flowchart that shows an exemplary stapling process. While one process is shown to illustrate some of the features of the embodiments herein, other processes could be used, and FIGS. 7A-B is merely a non-limiting example.

In this staple finishing example, after checking that the finisher is attached, the printing device will count the number of pages to be printed. If the document is a single page, then the printing device will print a simplex print job, without staples; and if the job is two pages, then the printer will print duplex, without staples. If the pages count is and odd number of pages, then the last page of the job print will print as simplex. For an even page count, all pages will be duplex printed. If the page count exceeds the staple capacity, then the printing device will provide a menu display on the user interface to ask the user whether to split the job. If the loaded paper orientation does not match a finishing workflow corresponding to a folder with a 4 staple option name, then the printing device will automatically choose default staple option (e.g., 2 staple). If the printing device is not connected to any finisher, then the printing device will ask the user for normal print confirmation, otherwise the printing device will stop the process.

In item 400, the stapling processing starts. In item 402, USB reading of a job from a folder (e.g., the Insta_Staple/Insta_Staple1/Insta_Staple4 folder) is performed. Item 404 shows that this processing determines whether a D/BR finisher is attached; and, if it is, processing flows to item 406; and otherwise processing flows to item 408. More specifically, in item 408, a message is provided on the user interface that there is no finisher attached, and the user is provided a menu that gives the user the option to continue or not. As shown in item 412, if they do not want to continue, processing flows to item 410 where the processing stops; however, if they want to continue, processing flows to item

414, where duplex printing is performed, after which processing flows to item 410, where the processing stops.

If item 404 determines that the finisher is attached, processing flows to item 406, where the systems herein determine the number of pages in the document to be printed. If there are only 2 pages, the processing flows to item 416, where the user interface displays a message that duplex printing without using staples will be used (in item 418) and then the process flows to item 414 where duplex printing is performed, after which processing flows to item 410, where the processing stops. As shown in item 420, if the document only contains a single page, the processing continues to item 422, where the user interface displays a message that duplex printing without using staples will be used; and then processing flows to item 424, where simplex printing is performed, after which processing flows to item 410, where the processing stops.

If the systems herein determine that the number of pages in item 406 exceeds the staple capacity of the printing device, the user is provided the option of whether the split the document and print, as shown in item 426. The user selects from a Yes/No option and can specify the quantity of pages to be printed as shown in item 428, and if yes is selected, processing flows back to item 406. If the No option is selected, the processing flows to item 410, where the processing stops.

If the processing determines the number of pages in item 406 is an odd number, as shown in item 430, the processing flows to item 432 where the last page of the document in will be printed in simplex mode, after which processing flows to item 436, where the processing checks if the paper tray is empty or loaded. If the processing determines the number of pages in item 406 as an even number, as shown in item 434, the processing flows to item 436. In item 436, if the processing determines that the paper tray is empty, the process flows to item 438, whereby the user is prompted to load the tray is with print media (e.g., 75-105 GSM), and then the process flows back.

Once the processing has determined that the paper tray is loaded with media, the process flows to items 440, 442, or 444 depending upon the specific stapling options specified by the folder in which the job was located. Thus, the previously described Insta_Staple4 occurs in item 440; Insta_Staple occurs in item 442 and Insta_Staple1 occurs in item 444.

The processing then flows from item 440 to item 446 where the process determines if the paper loaded, and if the paper size is acceptable (e.g., less than A3 in size). If the processing process determines that there is paper loaded in and the paper size is acceptable, the processing flows to item 448, whereby the document is duplex printed with 2 staples, otherwise processing flows to item 450 where the document is printed in duplex mode with 4 staples. The processing flows from items 442 and 446 to item 448 where the document is printed in duplex mode with 2 staples. From item 444 processing process flows into item 452 where the document is printed in duplex mode with a single staple.

Following items 448, 450 and 452, the display device provides a menu that asks the user if they want to print more copies and in what quantity, as shown in item 456. If yes, the process flows to item 458 where the document in printed in duplex mode with either single staples, 2 staples, or 4 staples, after which processing flows to item 410, where the processing stops. If the user selects no, then the processing flows to item 410, where the processing stops.

Figure 8A:
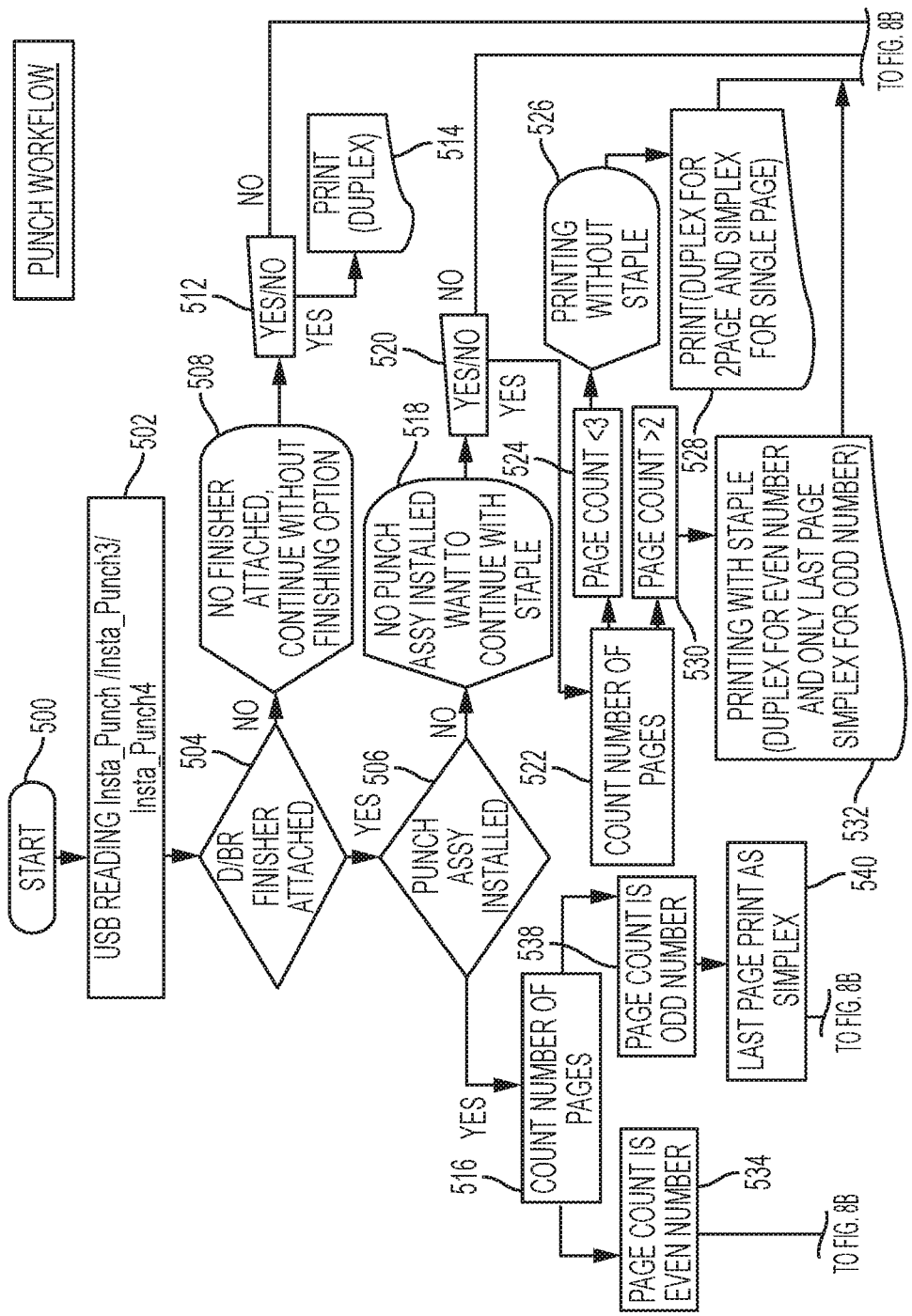
FIGS. 8A-B, are flow diagrams of various methods herein.
Figure 8B:
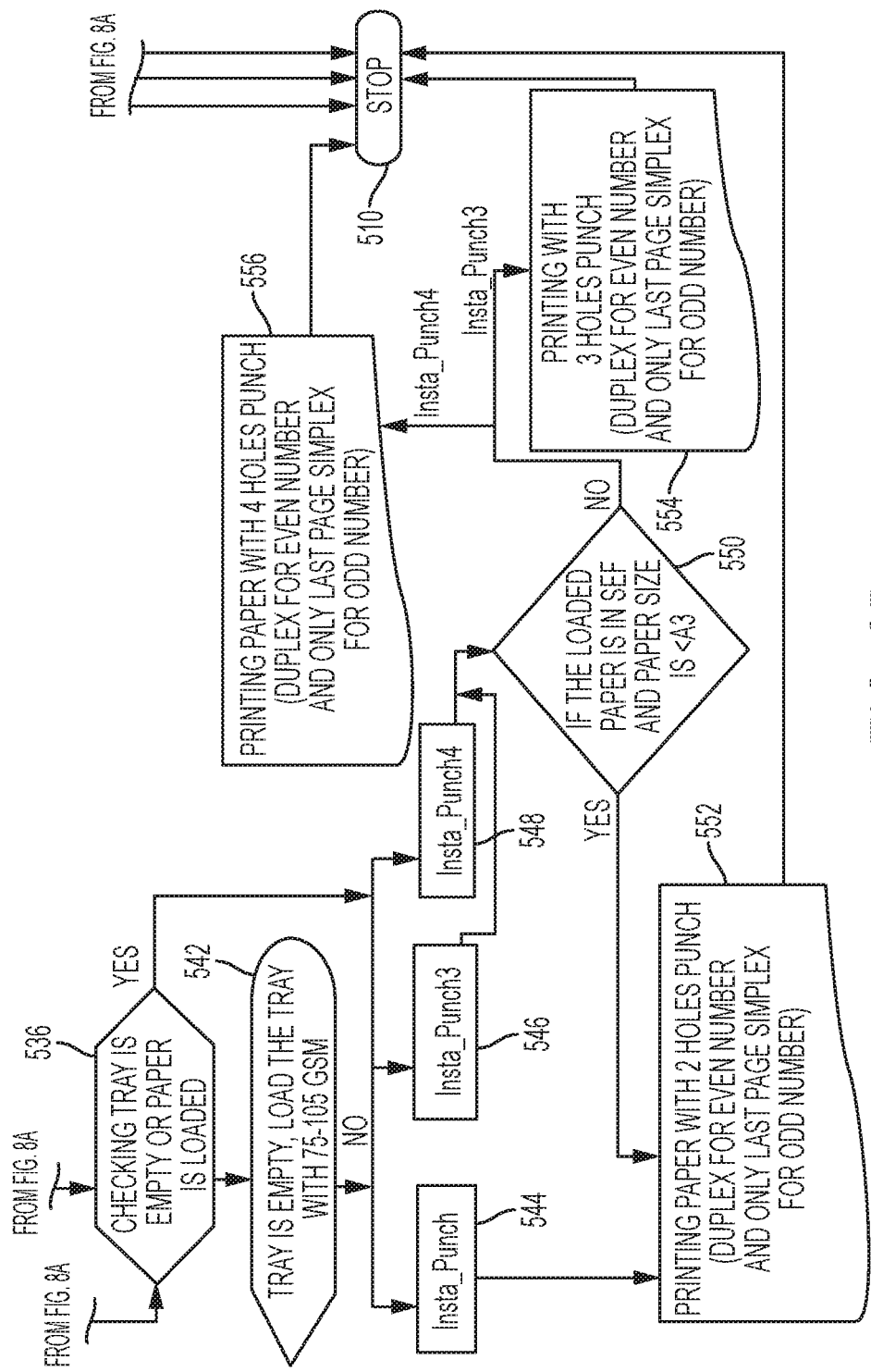

FIGS. 8A-B is a flowchart that shows an exemplary punching process. While one process is shown to illustrate some of the features of the embodiments herein, other processes could be used, and FIGS. 8A-B is merely a non-limiting example.

For the punch finisher job example, the printing device will print with the punch option once the printing device detects that the finisher with punch assembly is connected and functional (without any user action, other than the user connecting the USB device to the printer). If the number of pages to be printed is odd, the last page will print as simplex; and for an even number of printing pages, all pages will print using duplex printing. If the finisher does not have a punch assembly, but has a staple assembly, then the printing device will provide a menu display on the user interface to ask the user whether the user instead wants the job to print with a staple finishing option. If the user placed the file in a folder with a name corresponding to a workflow programmed for 4 punch option, but the punch finishing device only has a 2/3 punch assembly, then printing device will automatically process the job with a default punch option (e.g., 2 holes punch). This scenario is same if, for example, the user selected a folder corresponding to a workflow for 3 holes punch, but the printing device is installed with 2/4 punch assembly. If the loaded paper orientation does not match 3 hole punch or 4 hole punch option, then device will print with default punch option (e.g., 2 hole punch).

As shown, in item 500, the punching processing starts. In item 502, USB reading of a job within a folder (e.g., Insta_Punch/Insta_Punch3/Insta_Punch4 folder) is performed. Item 504 shows that this processing determines whether a D/BR finisher is attached; and, if it is, processing flows to item 506; and otherwise processing flows to item 508. More specifically, in item 508, a message is provided on the user interface that there is no finisher attached, and the user is provided a menu that gives the user the option to continue or not. As shown in item 512, if the user does not want to continue, processing flows to item 510 where the processing stops; however, if they want to continue, processing flows to item 514, where duplex printing is performed, after which processing flows to item 510, where the processing stops.

If, in item 504, the systems herein determine that the finisher is attached, processing flows to item 506, where these systems determine whether a punch assembly is installed. If yes, the processing flows to item 516, where the process counts the number of pages in the document.

Again, rather than just stopping at a message indicating that the device is incapable of performing a requested finishing operation (518), the systems and methods herein go further and determine what similar finishing functions can be performed. For example, a stapler may be available and connected, even though a punch module may not be. So, if no punch assembly is present, the process flows to item 518, where a menu is displayed that asks the user whether they want to continue with staples instead. The user response (Yes/No) is shown in item 520.

Flowing from in item 520, if the user does not want to continue, processing flows to item 510 where the processing stops; however if the user does want to continue then the process flows to item 522, where the number of pages in the document are counted. If the page count is less than a predetermined number (e.g., 3) as shown in item 524, a message is displayed to the user that printing will occur without staples (item 526), and process flows to item 528 where duplex or simplex printing is performed, after which processing flows to item 510, where the processing stops. As shown in item 530, if the document has a sufficient number of pages (e.g., more than 2) the processing continues to printing with a staple in item 532 in either duplex mode for an even numbers of pages or simplex mode for an odd number, after which processing flows to item 510, where the processing stops.

Following item 516, if the page count number is even, the process flows from item 534 into the next process in item 536 to determine whether the paper tray is empty or loaded with printed materials. In item 516, if the page count number is odd, the process flows from item 538, to item 540 where the last page of document will be printed in simplex mode. In item 536, if the processing determines that the paper tray is empty, the process flows to item 542, whereby the user is prompted to load the tray is with print media (e.g. 75-105 GSM).

Once the processing has determined that the paper tray is loaded with media, the process flows to either item 544 for Insta_Punch, item 546 for Insta_Punch3, or item 548 for Insta_Punch4 (all depending upon the name of the folder on the USB device in which the job is located). The processing then flows from items 546 or 548 to item 550 where the systems determine if the paper loaded and if the paper size is of a certain size (e.g. less than A3 in size). If the processing process determines that there is paper loaded and the paper size is correct, the processing flows to item 552. Similarly, processing flows from item 544 to item 552. In item 552, the document is duplex printed (for an even number of pages) with 2 hole punches and then the processing flows to item 510, where the processing stops.

If the processing in item 550 determines that paper is present and that the paper size is of a specific size (e.g., not less than A3/11×17 inch), the process flows to item 554 for Insta_Punch3, whereby the document is printed with 3 holes punch (in duplex mode for even numbered page count, and with only the last page printed in simplex mode for an odd numbered page count) after which processing flows to item 510, where the processing stops. Alternatively, for Insta_Punch4 processing flows from item 550 to item 556, whereby the document is printed with 4 holes punch (in duplex mode for even numbered page count, and with only the last page printed in simplex mode for an odd numbered page count) after which processing flows to item 510, where the processing stops.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatic and/or xero-machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   automatically detecting connection of a universal input/output connector of a portable electronic memory apparatus to a corresponding connector of an external computerized device, using a finishing workflow control program stored in electronic memory media of said portable electronic memory apparatus;
   limiting said external computerized device from naming finishing-job storage folders stored within said electronic memory media to names other than names of known finishing workflows, using said finishing workflow control program;
   automatically requiring said external computerized device to store print jobs having finishing instructions only within said finishing-job storage folders, using said finishing workflow control program;
   automatically detecting connection of said universal input/output connector to a corresponding connector of a printing system having finishing components, using said finishing workflow control program;
   for each print job of said print jobs having finishing instructions, automatically instructing said printing system to perform a finishing workflow that corresponds to a name of a finishing-job storage folder in which said print job is located, using said finishing workflow control program;

automatically requiring said printing system to evaluate whether said printing system can perform said finishing workflow based on status of said finishing components, using said finishing workflow control program; and automatically, using said finishing workflow control program, requiring said printing system to either:

perform said finishing workflow, if said printing system can perform said finishing workflow; or provide a menu on a user interface of said printing system, if said printing system cannot perform said finishing workflow.

2. The method according to claim 1, said workflow control program includes finishing settings for said known finishing workflows corresponding to said finishing-job storage folders.

3. The method according to claim 2, further comprising automatically, using said workflow control program, supplying said finishing settings to said printing system when said finishing workflow control program requires said printing system to perform a finishing workflow that corresponds to a name of a finishing-job storage folder in which said print job is located.

4. The method according to claim 2, further comprising automatically, using said workflow control program, requiring input of said finishing settings when adding a finishing-job storage folder to said electronic memory media.

5. The method according to claim 1, selection of said menu on said user interface of said printing system causes said printing system to avoid some of, or all of, said finishing workflow.

6. The method according to claim 1, said names of finishing workflows include:

different names for different booklet finishing workflows;

different names for different staple finishing workflows;

different names for different punching finishing workflows;

different names for different folding finishing workflows;

different names for different cutting finishing workflows; and different names for different laminating finishing workflows.

7. The method according to claim 1, said universal input/output connector comprises a universal serial bus (USB) connection.

8. A portable electronic memory apparatus comprising:

a universal input/output connector;

electronic memory media electrically connected to said universal input/output connector; and a finishing workflow control program stored in said electronic memory media, said finishing workflow control program automatically detects connection of said universal input/output connector to an external computerized device, said finishing workflow control program limits said external computerized device from naming finishing-job storage folders stored within said electronic memory media to names other than names of known finishing workflows, said finishing workflow control program automatically requires said external computerized device to store print jobs having finishing instructions only within said finishing-job storage folders, said finishing workflow control program automatically detects connection of said universal input/output connector to a printing system having finishing components, for each print job of said print jobs having finishing instructions, said finishing workflow control program automatically instructs said printing system to perform a finishing workflow that corresponds to a name of a finishing-job storage folder in which said print job is located, said finishing workflow control program automatically requires said printing system to evaluate whether said printing system can perform said finishing workflow based on status of said finishing components, and said finishing workflow control program automatically requires said printing system to either:

perform said finishing workflow if said printing system can perform said finishing workflow; or provide a menu on a user interface of said printing system if said printing system cannot perform said finishing workflow.

9. The portable electronic memory apparatus according to claim 8, said workflow control program includes finishing settings for said known finishing workflows corresponding to said finishing-job storage folders.

10. The portable electronic memory apparatus according to claim 9, said workflow control program automatically supplies said finishing settings to said printing system when said finishing workflow control program requires said printing system to perform a finishing workflow that corresponds to a name of a finishing-job storage folder in which said print job is located.

11. The portable electronic memory apparatus according to claim 9, said workflow control program automatically requires input of said finishing settings when adding a finishing-job storage folder to said electronic memory media.

12. The portable electronic memory apparatus according to claim 8, selection of said menu on said user interface of said printing system causes said printing system to avoid some of, or all of, said finishing workflow.

13. The portable electronic memory apparatus according to claim 8, said names of finishing workflows include:

different names for different booklet finishing workflows;

different names for different staple finishing workflows;

different names for different punching finishing workflows;

different names for different folding finishing workflows;

different names for different cutting finishing workflows; and different names for different laminating finishing workflows.

14. The portable electronic memory apparatus according to claim 8, said universal input/output connector comprises a universal serial bus (USB) connection.

15. A printing system comprising:

a universal input/output connector;

a processor electrically connected to said universal input/output connector;

a user interface electrically connected to said processor;

a printing engine electrically connected to said processor; and finishing components electrically connected to said processor, said processor automatically detects connection of a portable electronic memory apparatus to said universal input/output connector, said processor automatically searches said portable electronic memory apparatus for print jobs having finishing instructions, if said processor detects said print jobs having finishing instructions not within finishing-job storage folders having names only of known finishing workflows, said processor automatically causes said user interface to display:
- a message to include said print jobs having finishing instructions only within said finishing-job storage folders having names only of known finishing workflows; and
- an option to store said print jobs having finishing instructions within said finishing-job storage folders having names only of known finishing workflows, for each print job of said print jobs having finishing instructions, said processor automatically instructs said finishing components to perform a finishing workflow that corresponds to a name of a finishing-job storage folder in which said print job is located, said processor automatically evaluates whether said finishing workflow can be performed based on status of said finishing components, and said processor automatically requires either:
- said finishing components perform said finishing workflow, if said printing system can perform said finishing workflow; or
- said user interface provide a menu, if said finishing components cannot perform said finishing workflow.

16. The printing system according to claim 15, said portable electronic memory apparatus includes finishing settings for said known finishing workflows corresponding to said finishing-job storage folders.

17. The printing system according to claim 16, said portable electronic memory apparatus automatically supplies said finishing settings to said printing system when said processor requires said printing system to perform a finishing workflow that corresponds to a name of a finishing-job storage folder in which said print job is located.

18. The printing system according to claim 16, said processor automatically requires input of said finishing settings when adding a finishing-job storage folder to said portable electronic memory apparatus.

19. The printing system according to claim 15, selection of said menu on said user interface causes said finishing components to avoid some of, or all of, said finishing workflow.

20. The printing system according to claim 15, said names of finishing workflows include:
- different names for different booklet finishing workflows;
- different names for different staple finishing workflows;
- different names for different punching finishing workflows;
- different names for different folding finishing workflows;
- different names for different cutting finishing workflows; and
- different names for different laminating finishing workflows.

* * * * *